United States Patent [19]

Boni

[11] Patent Number: 4,794,006
[45] Date of Patent: Dec. 27, 1988

[54] STRENGTHENED EDIBLE COLLAGEN CASING AND METHOD OF PREPARING SAME

[75] Inventor: Kenneth A. Boni, Columbia, S.C.

[73] Assignee: Teepak, Inc., Oak Brook, Ill.

[21] Appl. No.: 44,080

[22] Filed: Apr. 29, 1987

[51] Int. Cl.$^4$ .............................................. A22C 13/00
[52] U.S. Cl. .................................... 426/140; 426/278
[58] Field of Search ............... 426/140, 135, 657, 278; 530/356

[56] References Cited

U.S. PATENT DOCUMENTS 3,413,130 11/1968 Rose .
3,512,997 5/1970 Cohly et al. .
3,533,809 10/1970 Cohly et al. .
3,932,677 1/1976 Burke .................................. 426/277
4,061,787 12/1977 Higgins .......................... 426/278 X

OTHER PUBLICATIONS

Hart et al., "The Effects of Certain Glycols, Substituted Glycols and Related Organic Solvents on the Thermal Stability of Soluble Collagen", Biochem. Journal (1971) 125, pp. 599-604.

Primary Examiner—Arthur L. Corbin
Attorney, Agent, or Firm—Michael L. Dunn

[57] ABSTRACT

A food casing comprising collagen treated with a lower alkyl diol. The casing has improved mechanical properties at low temperatures.

14 Claims, No Drawings

STRENGTHENED EDIBLE COLLAGEN CASING AND METHOD OF PREPARING SAME

BACKGROUND OF THE INVENTION

Collagen is commonly used in the preparation of food casings but the manufacture of such products, in particular, meat products, is frequently complicated by the frailty of the product. This is aggravated by the necessity that such products be stuffed at low temperatures, generally at temperatures lower than 40° F. At these low temperatures, there is an increased probability of mechanical breakage of the casings. This is commercially undesirable since significant blocks of time would be lost due to downtime for cleaning and restarting.

Over a period of years, thick walled synthetic sausage casings have been prepared from animal collagen. Collagen casings have been prepared by processing the corium layer of animal hides to break the collagen into a fibrous structure. The collagen fibers are then extruded in the form of a doughy mass to produce tubular casings. The casings which have been prepared in this manner have been hardened by treatment with aluminum salts followed by formaldehyde and/or other aldehydes and have been used as removable casings for processing various sausages. These casings have not been edible even though collagen itself is edible. Even if it were edible, products made with these casings would not be commercially desirable.

The thickness of the casing for edible products would have many disadvantages. On the consumer level, there would be a lack of appeal because of the dense appearance and the difficulty in chewing a product made with such a thick casing. On the commercial level, there would be a waste of materials and increased cost in producing these thick walled casings. The thick walls make modern high speed stuffing more difficult. In addition, they require greater packaging room, e.g. in shirred casings.

Thinner walled edible sausage casings of collagen have been prepared and sold in commercial quantities. In the manufacture of these casings, one approach uses a collagen source material which has not been subjected to a liming treatment. Another technique makes use of limed collagen source material by observing special processing methods. Although both methods are capable of producing casings which are edible and have other advantageous properties adapting them for use as sausage casings, these methods do not overcome the disadvantage of requiring relatively extensive and involved processing and handling procedures due to its frailty.

It is therefore an object of the invention to provide a strengthened casing product which comprises collagen and which is useful as sausage casings wherein the disadvantages of the prior art collagen materials are overcome.

It is a further object of the present invention to provide collagen casings which are of sufficiently high mechanical strength to resist breakage during sausage manufacturing processes at low temperatures.

It is a further object of the present invention to provide collagen casings which are of sufficiently high mechanical strength that the thickness of the casings can be considerably reduced when compared with prior art casings.

It is a further object of the present invention to provide a method for preparing collagen type casings of high mechanical strength by which the disadvantages of the prior art processes are avoided.

Another object of the invention is to provide such a casing having good antimycotic properties.

Still another object of the invention is to accomplish the foregoing objects while providing an edible collagen casing.

Additional objects, if not specifically set forth herein, will be apparent to one skilled in the art from the following description of the invention.

BRIEF DESCRIPTION OF THE INVENTION

In accordance with the present invention, a strengthened food casing is provided which comprises collagen treated with a lower alkyl diol. The casing has improved resistance to breakage at low temperatures, i.e. temperatures commonly encountered in meat packing operations. The lower alkyl diol may be any diol having from four to eight carbon atoms. The diol is desirably of low toxicity and physiologically acceptable to permit use in food casing applications and even more preferably to permit the casing to be eaten.

The invention further comprises the method for strengthening a collagen casing by incorporating such a diol into a collagen casing.

DETAILED DESCRIPTION OF THE INVENTION

In accordance with the present invention, it has now been discovered that the addition of specific amounts of a lower alkyl diol unexpectedly increases the strength of collagen casing. Casings that are prepared in accordance with the present invention have sufficient strength and stiffness to be shirred, stuffed and linked using commercial equipment without undue rupture or stretching at low temperatures. Such temperatures are usually from about −7° C. to about 4° C. (about 20° F. to about 40° F.).

Generally, the present invention comprises taking a collagen casing commercially available and known in the art similar to that disclosed in U.S. Pat. No. 3,932,677 and treating it with a lower alkyl diol. The lower alkyl diol is a diol containing from four to eight carbon atoms. The plasticizer is usually glycerine, propylene glycol or mixtures thereof. The lower alkyl diol may, for example, be 1,3 butanediol which in addition to providing improved low temperature properties, also provides antimycotic properties.

"Mechanical properties" as used herein includes tensile strength, extensibility, burst strength and stiffness. One or more of these properties is improved in accordance with the invention for improved handling at low temperatures, i.e. from about 20° F. to about 40° F. These properties can be measured by known means. An increase in strength and stiffness in the casings prepared according to the present invention, for example, can be observed using the conventional measures of strength and stiffness, i.e. break stress and modules using commercially available instruments.

The lower alkyl diol is incorporated as a component of the liquid phase of the casing. The liquid phase of the present invention usually comprises between about 25-50% of the casing weight and is usually a ternary mixture of water, plasticizer and the lower alkyl diol. The lower alkyl diol is between about 5% and about 40% of the liquid phase and the ratio of water to plasticizer in the liquid phase is desirably between about 0.8:1 to about 2:1.

The following specific example serves to illustrate and not limit the present invention. Unless otherwise indicated, all parts and percentages are by weight.

Code 24 (24 mm diameter, 0.04 mm wall thickness) collagen casing was prepared by collagen extrusion substantially as described in U.S. Pat. Nos. 3,413,130; 3,512,997; and 3,533,809. The extruded collagen casings were passed through a tank containing an aqueous solution of 0.08 percent glutaraldehyde and 2.5 percent glycerine.

The resulting casing was then passed through an aqueous bath containing 0.37% glycerine and 3.5% 1,3 butanediol. The casing (Sample C) was found to have percentages of butanediol, glycerine and water as set forth in Table I. Variations in percentage of butanediol (Samples A, B and D) were obtained by spraying additional butanediol on the shirred casing strands.

The samples showing various concentrations of butanediol, water and glycerine by total weight of casing are set forth in Table I. The values are by analysis and may vary from actual by as much as about 10%.

TABLE I

| Sample | A | B | C | D | Control |
|---|---|---|---|---|---|
| Butanediol (BD) | 10.5 | 8.3 | 4.2 | 7.5 | 0 |
| Glycerine | 3.8 | 3.8 | 3.8 | 3.8 | 17 |
| Water (2 test average) | 17.5 | 17.9 | 19.6 | 18.2 | 18.6 |

The sample with a liquid phase prepared according to the invention, comprising 55% water, 33% 1,3 butanediol and 12% glycerine (Sample A) was compared to a sample prepared according to the prior art with a liquid phase of 52% water and 48% glycerine (control).

The modulus at 10% elongation was found to be significantly greater at all temperatures with the ternary mixture containing the 1,3 butanediol when compared with the binary mixture. The modulus of the ternary mixture was 18 to 27% greater in the temperature range of 20°-36° F. than the sample containing only glycerine and water, therefore there is a clear benefit to modulus from adding butanediol. There is also a benefit to break stress at low temperatures from addition of butanediol. Unlike the modulus, at 36° F there appears to be no significant difference while at 20° F. there is 17% difference. Improvement in mechanical properties is also found when Samples B, C and D are similarly tested.

An increase of 5% in casing modulus or break stress is significant to field performance. The lower limit for a detectable benefit to mechanical properties from incorporation of the lower alkyl diol is about 2% of the casing weight or 5% of the liquid phase.

The effect of the addition of a lower alkyl diol in a ternary mixture with water and glycerine to increase strength at low temperatures is unexpected. The viscosity of lower alkyl diols is very low, in fact the viscosity is similar to that of water. In contrast, glycerine is a very viscous material. Thus, it would have been expected that the addition of a lower alkyl diol to a mixture of water and glycerine would actually dilute the mixture. Therefore, the increase in viscosity of the mixture is completely unexpected.

The use of 1,3 butanediol in accordance with the present invention has another benefit since it has been found to be an excellent antimycotic.

While the invention has now been described in terms of certain preferred embodiments, obviously various substitutions, modifications and omissions to the invention as herein before set forth may be made without departing from the spirit and scope thereof. Accordingly, it is intended that the scope of the present invention be limited solely by that of the following claims.

What is claimed is:

1. A food casing, having improved mechanical properties at low temperatures, comprising collagen and a low temperature, food casing mechanical property improving amount of a lower alkyl diol.

2. The casing of claim 1 wherein the lower alkyl diol is 1,3 butanediol.

3. The casing of claim 2 wherein the casing is an edible casing comprising a sufficient amount of 1,3 butanediol to resist breakage at temperatures less than about 40° F. under normal food stuffing conditions.

4. The casing of claim 3 wherein the casing is a shirred casing in the form of a tubular strand.

5. The casing of claim 2 wherein the 1,3 butanediol is a component of a liquid phase of the casing.

6. The casing of claim 5 wherein the liquid phase comprises more than about 25% of the casing weight.

7. The casing of claim 2 wherein the 1,3 butanediol comprises at least about 5% of a liquid phase of the casing.

8. The casing of claim 2 wherein the 1,3 butanediol comprises at least about 2% of the casing weight.

9. The casing of claim 2 wherein the casing is a shirred casing in the form of a tubular strand.

10. A method for improving mechanical properties of a collagen food casing at low temperatures comprising, incorporating into a collagen food casing, as a component of the liquid phase of the casing, a low temperature, mechanical property improving amount of a lower alkyl diol.

11. The method of claim 10 wherein the casing is an edible casing and the lower alkyl diol is 1,3 butanediol.

12. The method of claim 10 wherein the 1,3 butanediol comprises at least about 2% of the casing weight.

13. The method of claim 12 wherein the 1,3 butanediol comprises from about 5 to about 40% of a liquid phase of the casing, said liquid phase further comprising a mixture of water and glycerin in a ratio of about 0.8:1 to a ratio of about 2:1.

14. The method of claim 12 wherein the casing is a shirred casing in the form of a tubular strand.

* * * * *